(12) United States Patent
Mestemacher

(10) Patent No.: US 7,000,646 B2
(45) Date of Patent: Feb. 21, 2006

(54) POLYMERIC PIPES AND LINERS AND FUEL LINES MADE FROM BLENDS OF FLUOROPPOLYMERS AND POLYAMIDES

(75) Inventor: Steven A. Mestemacher, Parkersburg, WV (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 112 days.

(21) Appl. No.: 10/699,332

(22) Filed: Oct. 30, 2003

(65) Prior Publication Data

US 2005/0048239 A1    Mar. 3, 2005

Related U.S. Application Data

(60) Provisional application No. 60/422,814, filed on Oct. 31, 2002.

(51) Int. Cl.
  *F16L 11/00*   (2006.01)

(52) U.S. Cl. .................. 138/137; 138/141; 138/98; 428/36.91

(58) Field of Classification Search .......... 138/98, 138/118, 137, 140, 141, DIG. 7; 428/36.91
See application file for complete search history.

(56) References Cited

U.S. PATENT DOCUMENTS

| | | | |
|---|---|---|---|
| 4,444,817 A * | 4/1984 | Subramanian | 428/36.4 |
| 5,209,958 A * | 5/1993 | Katsaros et al. | 428/36.91 |
| 5,576,106 A * | 11/1996 | Kerbow et al. | 428/403 |
| 5,716,684 A * | 2/1998 | Stoeppelmann et al. | 428/36.91 |
| 5,814,384 A * | 9/1998 | Akkapeddi et al. | 428/35.7 |
| 6,127,478 A * | 10/2000 | Spohn | 525/66 |
| 6,209,587 B1 * | 4/2001 | Hsich et al. | 138/137 |
| 6,284,335 B1 * | 9/2001 | Spohn | 428/36.91 |
| 6,482,482 B1 * | 11/2002 | Spohn | 428/35.7 |
| 6,524,671 B1 * | 2/2003 | Spohn | 428/35.7 |
| 6,528,137 B1 * | 3/2003 | Franosch et al. | 428/36.9 |
| 6,855,787 B1 * | 2/2005 | Funaki et al. | 526/250 |
| 2003/0198770 A1 * | 10/2003 | Fukushi et al. | 428/36.91 |

FOREIGN PATENT DOCUMENTS

EP     761 757 B1     12/1999

* cited by examiner

*Primary Examiner*—James Hook

(57) ABSTRACT

A pipe or liner for use in the oil and gas industry that comprises a melt-mixed bend of polyamide and grafted fluoropolymer having polar functionality where the grafted fluoropolymer having polar functionality exists as a discontinuous phase that is dispersed in a polyamide matrix. The pipe or liner has enhanced resistance to the permeation of hydrocarbons relative to polyethylene. A further embodiment is fuel lines that comprise a melt-mixed bland of polyamide and a grafted fluoropolymer having polar functionality.

18 Claims, No Drawings

POLYMERIC PIPES AND LINERS AND FUEL LINES MADE FROM BLENDS OF FLUOROPPOLYMERS AND POLYAMIDES

CROSS REFERENCE TO RELATED APPLICATIONS

This application claims the benefit of U.S. Provisional Application No. 60/422,814, filed Oct. 31, 2002.

FIELD OF THE INVENTION

This invention relates to pipes and liners for use in the oil and gas industry. More particularly, this invention relates to such pipes and liners that comprise a melt-mixed blend of polyamide and a grafted fluoropolymer having polar functionality that provides an enhanced barrier to the permeation of hydrocarbons. This invention also relates to fuel lines that comprise a melt-mixed blend of polyamide and a grafted fluoropolymer having polar functionality.

BACKGROUND OF THE INVENTION

The nature of the oil and gas industry is such that a wide variety of materials, including solids, liquids, and gases need to be transported through different sorts of pipes under a wide variety of conditions. One feature that all these pipes share is that they must be made from materials that are impermeable and resistant to the substances being transported. Such substances can include not only hydrocarbons, but water and salt water.

For example, drilled oil wells are typically lined with steel casings. The steel is susceptible to erosion and corrosion, however, and, as a result, these pipes have been lined with plastic liners in both onshore and offshore pipelines. The casing liner must be capable of withstanding temperatures and pressures typically encountered in oil and gas wells, and must have compression and-memory properties that allow it to be downsized for insertion into the casing and subsequently permit it to expand to form a fluid tight seal against the casing. Polyethylene pipe is considered to be the preferred material for the fabrication of the casing. In addition to its good compression and memory properties, polyethylene pipe is resistant to abrasion, which enables it to withstand the passage of downhole tools, and resistant to salt water and some chemical corrosion. Furthermore, polyethylene pipe can be formed into a long, continuous tube containing no joint connections. This is important in that many casing leaks occur in or near the connection between one segment of casing and another. However, for high temperature and aggressive chemical environments, nylon 11 is often used. Performance is much improved, but the cost is such that nylon 11 is only considered for highly demanding applications.

A method for lining steel casings used in well-drilling operations, preferably with polyethylene, for purposes of corrosion protection has been disclosed in Vloedman, U.S. Pat. No. 5,454,419. A procedure is described for reducing a continuous string of polyethylene pipe in diameter and then running it into a casing-lined well bore in such a manner that the polyethylene pipe remains in a reduced state until the polyethylene pipe reaches a pre-selected depth. After the polyethylene pipe is run to the desired depth, the reduced pipe is allowed to rebound, thereby forming a fluid-tight seal with the casing and effectively sealing any breaches in the casing.

While the method disclosed in U.S. Pat. No. 5,454,419 patent has successfully met the need for repairing breaches in casings in an effective and time efficient manner, several inefficiencies have nevertheless been encountered, particularly in circumstances when only a selected segment of the casing is in need of repair. If only a relatively short section of approximately 100 to 2000 feet of casing is in need of repair and this section is located several thousand feet below the surface, for example, it is more cost effective if the casing does not have to be lined entirely from the surface to the pertinent section, and U.S. Pat. No. 6,283,211, also by Vloedman, discloses a method of repairing portions of a pipe.

In other known liner systems, the liner resides in close-tolerance with the host pipe along its length, forming a stable composite system. The installed liner may be either loose-fit or compressed-fit. In all but low pressure applications, the stresses induced by fluid pressure from within the liner are transmitted to the surrounding host tubular and the host tubular resists these transmitted stresses. As hydrocarbon fluids permeate through the liner, there is a resulting build up of pressure in the annulus (the space between the liner and the inside surface of the host pipe) which can directly result in corrosion, leakage and/or liner collapse if the pressure inside the pipe drops below that of the annulus. All are major deficiencies. Where the liner outer surface maintains a significant degree of contact with the inner host wall there is a significant degree of sealing. The annular cross sectional area is thus reduced to the extent that only an extremely tortuous path for the annular fluid's migration toward any venting mechanism along the system exists.

U.S. Pat. No. 6,220,079 (Taylor), addresses this problem by disclosing a method of decreasing the negative effects of pressure in the annulus by modification of the liner configuration from its usual uniform cylindrical shape to include the incorporation of multiple conduits between the liner and the host tubular. These conduits provide a relatively inexpensive means for venting the pressure, which can help prevent liner collapse, and also permit the introduction of instruments for making measurements.

Other contributors to the onset of liner collapse include the liner's mechanical properties, the nature of the fluid transported, pressure, temperature, and the effective rate of fluid permeation. The present invention discloses a method of addressing liner collapse by significantly decreasing the rate of fluid permeation through the liner.

U.S. Pat. No. 6,127,478 (Spohn) discloses a melt-mixed blend comprising a blend of polar-grafted fluoropolymer well-dispersed in an incompatible polyamide. This technology requires high shear and high mixing to obtain the well-dispersed blend.

It is an object of the present invention to provide pipes and liners with good permeation resistance to hydrocarbons. A feature of the present invention is to melt blend at least one polyamide and at least one grafted fluoropolymer having polar functionality in the process of forming the pipes and liners. It is an advantage of the present invention to provide pipes and liners comprising a polymeric material that has enhanced barrier properties relative to polyamides. A further advantage of the invention is to provide fuel lines with improved resistance to hydrocarbon permeability. These and other objects, features, and advantages will become better understood upon having reference to the detailed description herein.

SUMMARY OF THE INVENTION

There is disclosed and claimed herein pipes and liners suitable for use in transporting substances in oil and gas applications, comprising a melt-mixed blend of:
(a) at least one polyamide and;
(b) at least one grafted fluoropolymer having polar functionality, wherein said fluoropolymer is incompatible with said at least one polyamide (a);

wherein said polyamides (a) are in a continuous matrix phase and said fluoropolymers (b) are present in a discontinuous distributed phase in the form of a multitude of thin, substantially parallel, and overlapping layers of material embedded in the continuous phase.

DETAILED DESCRIPTION OF THE INVENTION

As used herein, the term "pipe" refers to a hollow, elongated, often cylindrical conduit that is typically used to contain substances that can include fluids, hydrocarbon effluent, finely divided solids, or gases during transport. By "oil and gas applications" is meant uses in the oil and gas industry that involve the removal of fossil fuels such as crude oil and natural gas from the earth and their subsequent transport and refinement. Such applications include, but are not limited to, tubing, casing, siphon strings, line pipe, and facility piping. The term "liner" is used here to identify a second layer that is used inside of a steel or other metal pipe, for protection, thus creating a "lined pipe" that is typically a multi-pieced construction of pipe. The term "line pipe" is distinct from a "lined pipe", and is the flow line between wellhead, vessels, pumps, storage facilities, and/or processing facilities. The term "tubular" is used in the oil and gas industry to refer to round pipes used in a variety of applications, including, but not limited to tubing, casing, siphon strings, line pipes, and facility piping.

As used herein when referring to a polymer, the term "particle" refers to the physical form of the bulk polymer and can be a pellet, cube, flake, powder, or other form known to those skilled in the art.

For the purposes of this invention, "incompatible polymers" mean polymeric materials that have substantially no mutual miscibility in the melt form.

As used herein, when the word "about" prefaces a numerical range, it is intended to apply to both the lower and upper limit.

The pipe or liner of this invention comprises a polymeric composition that comprises a melt-mixed blend of at least one polyamide and at least one grafted fluoropolymer having polar functionality (also referred to herein as "grafted fluoropolymer"), such that the grafted fluoropolymer portion exists in a discontinuous phase that is distributed in the polyamide continuous phase. The discontinuous grafted fluoropolymer phase exists in a laminar configuration, meaning that it comprises a multitude of domains in the form of thin, substantially parallel, and overlapping layers of material that are embedded in the continuous polyamide phase. The presence of these domains improves the barrier properties of the unmodified polyamide by creating an extended maze through which hydrocarbons or other substances must pass if they are to permeate or diffuse through the wall of the pipe or liner. The composition is made by mixing together particles of the polymers, heating the mixture to yield a heterogeneous melt of material, and forming the melt in a way that results in stretching the melt to yield an elongated discontinuous phase.

The presence of the laminar configuration of the discontinuous grafted fluoropolymer phase means that smaller amounts of grafted fluoropolymer are required to achieve a given degree of permeation resistance than would be obtained from a homogeneous blend. Homogeneous well-mixed blends are only partially effective until large quantities (e.g. >50%) of fluoropolymer are present, which then becomes cost prohibitive for these applications. Coextrusion construction of liners, etc. would require additional investment for additional extruders for each polymer. The current invention bypasses these traditional and more costly approaches by using a single step extrusion in a manner that allows for significantly reduced amounts of grafted fluoropolymer.

The pipes and liners of the present invention have reduced permeability to hydrocarbons relative to polyolefin pipes and liners. An advantage of using the liners of the present invention to line metal pipes used in the oil and gas industry is that the likelihood of system failure due to liner collapse is reduced. This collapse is most often triggered by the accumulation in the annulus of fluids that have permeated or diffused through the liner from the materials being transported by or stored in the pipe. Such fluids may exist in either gas or liquid phase depending upon conditions in the annulus. For the most part, an equilibrium is in effect; the fluid pressure within the pipe is generally greater than or equal to the annular pressure. However, in the course of normal operations, the pressure within the pipe may be reduced to substantially less than the annular fluid pressure, such as in an unplanned shutdown. The resulting pressure differential may allow an expansion of the annular fluid to occur as the pressures attempt to equalize. If the liner is unable to withstand the external stress on its own, radial buckling can result.

In one embodiment, the polymer particles, in unmelted form, are mixed thoroughly so as to provide a statistically homogeneous distribution and care must be exercised to avoid substantial additional mixing after the polymers have been heated to a melt. In another embodiment, the polymer particles can be combined in softened or molten form so long as the combination of polymers maintains a heterogeneous character. Combining the polymers at a temperature such that one of the polyamide or the grafted fluoropolymer is not softened or molten and then heating the combination can also establish the blend. It is preferable that a melted heterogeneous blend of incompatible polymers be established so that, when the melt is stretched, such as by extrusion forces, the polyamide is in the form of a continuous matrix phase and the grafted fluoropolymer is in the form of a discontinuous distributed phase. The discontinuous phase is present as a multitude of thin, substantially parallel and overlapping layers embedded in the continuous phase.

Although it is not required, it is preferred that the polyamide used in the practice of this invention be, as stated, in particulate form; and it is desired that both the polyamide and the grafted fluoropolymer should be mixed as particles. The particles should, as a general rule, be of a size such that the molten blend of incompatible polymers, when introduced to some melt stretching means, such as extrusion die lips, exhibits the heterogeneity preferred for the practice of the invention. When the particles, especially particles of the grafted fluoropolymer, are of too small a size, the melted blend, even though not excessively mixed, tends to function as a homogeneous composition because the domains of material making up the discontinuous polymer phase are so small. When the particles, especially particles of the grafted fluoropolymer, are of too large a size, the melted blend tends to form into pipes and liners having a marbleized structure rather than a laminar structure; the large domains of the materials that would make up the discontinuous phase extending to opposite boundaries of the pipe or liner and causing disruption of the material that would make up the continuous phase. The particles are preferably generally regular in shape, such as cubical or spherical or the like. The particles may, however, be irregular; and they may have one dimension substantially greater than another dimension such as would be the case, for example, when flakes of material are used. When each of the incompatible polymers is present as individual particles, the particles are generally of approximately the same size although such is not required.

The thickness of the layers of material in the discontinuous phase is a function of the particle size combined with the degree of stretching in the forming step. The particle size of the grafted fluoropolymer is generally selected with a view toward resulting, after stretching, in overlapping layers which can be from about 0.5 to 50 micrometers thick and, perhaps, sometimes slightly thicker.

The non-homogeneous melt-mixed blend of the present invention is preferably prepared by melt blending the ingredients together under low shear. As will be understood by those skilled in the art, the ingredients can first be combined in desired proportions and blended with each other in the dry state, such as by tumbling in a drum or by using a blender or other mixer, or can be combined by simultaneous or separate metering of the feed of one or more of the components to the melt blending device.

Once mixed, the incompatible polymers are heated to a temperature greater than the melting point of the highest melting polymer component. It is noted that the heating is conducted for the purpose of stretching the softened or melted blend. In the case of an incompatible polymer that exhibits no well-defined melting temperature, "melting temperature", as used here, refers to a temperature at least high enough that the polymers have been softened to the degree required to stretch each of the polymers in the blend. That heating results in a softened or melted heterogeneous blend of materials and the heating must be conducted in a manner that avoids substantial additional mixing of the incompatible polymers because such mixing could cause a homogenization and combination of the melted particles and could result in a melt and a pipe or liner of homogeneous, unlayered, composition. The heating can be conducted by any of several means well-known to those skilled in the art and is usually conducted in an extruder. It has been learned that a single-screw extruder of the type that is designed for material transport and not material mixing can be used between the heating and forming steps of this invention without causing homogenization of the two phase incompatible polymer composition. Low shear and low mixing extruders of the kind normally used for polyvinyl chloride, acrylonitrile, or polyvinylidene chloride can be used to practice this invention if they are used in a way to melt and transport the materials and minimize mixing of the components. High shear and high mixing extruders of the kind normally used for nylon and polyethylene are less desirable to practice this invention. Numerous other low shear melt blending devices, as known to those skilled in the art, can be used without departing from the spirit of the invention. To the extent that the composition retains an aspect of heterogeneity, the process and the product of this invention can be realized.

The process of forming the pipes and liners of the invention requires stretching of the melted blend followed by cooling. Stretching is an elongation of the two-phase melt to cause a substantial change in the dimensions of the domains in the discontinuous phase. Stretching can be accomplished by any of several means, or by a combination of more than one such means. For example, the melt can be extruded or coextruded between die lips. The stretching can be accomplished by a slight drawing following the extrusion or coextrusion of the blend of the heterogeneous melt.

The stretching can be in one direction or in perpendicular directions. Whether the stretching is conducted in one direction or two, there should be an elongation of from about 100 to 500 percent in at least one direction; and an elongation of from about 100 to 300 percent is preferred. While the upper limit set out herein is not critical, the lower limit is critical insofar as inadequate stretching does not yield the improved barriers to fluid permeation which characterize this invention. Avoidance of excessive stretching is important only insofar as excessive elongation of the melt may lead to weakening or rupture of the article.

Stretching is followed by cooling to below the temperature of the melting point of the lowest melting component to solidify the extruded part. The cooling can be conducted by any desired means and at any convenient rate.

The one or more polyamides of the composition used in this invention are present in about 60 to 95 or preferably about 70 to 90 weight percent based on the total amount of polyamide and grafted fluoropolymer in the composition. The one or more grafted fluoropolymers of the composition used in this invention are present in about 5 to 60 or preferably about 10 to 30 weight percent based on the total amount of polyamide and grafted fluoropolymer in the composition.

Any of the components can be used to introduce inert fillers into the composition provided only that the fillers are not of a kind or in an amount that would interfere with formation of the layered construction or with the desired or required properties of the composition. Amounts of plasticizers, opacifiers, colorants, lubricating agents, heat stabilizers, oxidation stabilizers, and the like that are ordinarily used in structural polymeric materials can be used herein. The amount of such filler is not included in the calculation of amounts of incompatible polymers and compatibilizers.

When used herein, the term "polyamides" refers to both homopolymers and copolymers. Polyamides are well known and are made by reacting carboxylic acids or their reactive equivalents with primary amines and/or lactams under well-known conditions. Lactams and aminoacids may also be reacted to yield polyamides. Examples of carboxylic acids used in polyamide preparation are adipic acid, suberic acid, sebacic acid, azelaic acid, malonic acid, glutaric acid, pimelic acid, isophthalic acid, terephthalic acid, and the like. Examples of primary diamines are tetramethylenediamine, pentamethylenediamine, hexamethylenediamine, octamethylenediamine, and the like. Exemplary polyamides include poly(pentamethylene adipamide), poly(hexamethylene adipamide), poly(hexamethylene sebacamide); polyamides obtained from lactams such as caprolactams and from amino acids such as 11-aminoundecanoic acid, and the like. Copolyamides are also suitable. Preferred polyamides and copolyamides each have melting points in the range of 170° C. to 270° C. and even more preferred in the range of 180° C. to 240° C., and include such polymers as polycaproamide, poly(11-aminoundecanoamide), polydodecanoamide, poly(hexamethylene sebacamide), poly(hexamethylene dodecanoamide), and copolymers of poly(hexamethylene adipamide) with polycaproamide. Also preferred are amorphous polyamide copolymers that do not have clearly-defined melting points, but that are derived in part from aromatic monomers such as isophthalic acid.

The polyamides used in the composition used in the present invention should be melt extrudable, and preferably have a number average molecular weight of at least 5000. Examples of polyamides include those made by condensation of equimolar amounts of at least one saturated dicarboxylic acid containing 4 to 14 carbon atoms with at least one diamine containing 4 to 14 carbon atoms. Excess diamine, however can be used to provide an excess of amine end groups over carboxyl end groups in the polyamide. Specific examples include polyhexamethylene adipamide (66 nylon), polyhexamethylene azelaamide (69 nylon), polyhexamethylene sebacamide (610 nylon), polyhexamethylene dodecanoamide (612 nylon), polycaprolactam (6 nylon), and their copolymers. Semi-aromatic polyamides that are melt extrudable can also be used in the melt-mixed blends of the present invention.

The grafted fluoropolymer having polar functionality used in the compositions used in the present invention are melt extrudable and are formed by grafting fluoropolymers with a compound containing a double bond and a polar group. Preferred fluoropolymers are the copolymers of ethylene with perhalogenated monomers such as tetrafluoroethylene (TFE) or chlorotrifluoroethylene (CTFE), such copolymers being often referred to as ETFE and ECTFE, respectively. In the case of ETFE, minor amounts of additional monomer are commonly used to improve properties such as reduced high temperature brittleness. Perfluoro (propyl vinyl ether) (PPVE), perfluoro(ethyl vinyl ether) (PEVE), perfluorobutyl ethylene (PFBE), and hexafluoroisobutylene (HFIB) are preferred additional comonomers. ECTFE may also have additional modifying comonomer. Other fluoropolymers that can be used include vinylidene fluoride ($VF_2$) polymers including homopolymers and copolymers with other perfluoroolefins, particularly hexafluoropropylene (HFP) and optionally TFE.

The fluoropolymer is functionalized by having an ethylenically unsaturated compound grafted thereto that imparts polar functionality to the fluoropolymer, the polar functionality being present as part of the ethylenically unsaturated compound. More particularly, the grafted fluoropolymer used in the melt-mixed blend of the present invention preferably is in the form of a powder having the grafting compound grafted to the surface of the powder particles. Thus, the grafted fluoropolymer is surface-grafted fluoropolymer powder, or surface-grafted fluoropolymer. Examples of polar functionality provided by grafting include acids, including carboxylic, sulfonic and phosphonic acids, and esters and salts thereof, and epoxides.

Glycidyl methacrylate is an example of a grafting compound that provides epoxide functionality. Among compounds for grafting onto and thereby becoming part of the grafted fluoropolymer, maleic acid, fumaric acid, and maleic anhydride are preferred. The compound grafted to the fluoropolymer will be present in an amount that is effective to cause, upon melt-mixing, the development in the blend of the dispersed platelets of the grafted fluoropolymer. Generally, the amount of grafted compound is in the range of 0.1 weight percent to 5 weight percent based on the total weight of the resultant grafted fluoropolymer. Preferably, the amount of grafted polar-functional compound is 0.2–3 weight percent, and more preferably 0.3–2 weight percent. The grafted fluoropolymer is prepared prior to melt blending with the polyamide.

The grafted fluoropolymer forms a dispersed phase of the melt-mixed blend used in the present invention. The melt mixing causes the grafted fluoropolymer to be present as multiple layers dispersed in the polyamide matrix.

Methods for preparing fluoropolymers grafted with an ethylenically unsaturated compound are described in U.S. Pat. No. 5,576,106, which is hereby incorporated by reference.

It is preferred that the grafted fluoropolymer and polyamide, if present, have a higher melt viscosity than the polyolefin at the temperature at which the pipes and liners of the present invention are formed.

The multiple layers of the grafted fluoropolymer result in the non-homogeneous melt-mixed blend having good mechanical properties; a surprisingly low permeability to chemicals such as hydrocarbon and hydrocarbon-based fuels having high vapor pressures; and good resistance to chemical attack. These properties make the blend suitable for use as a barrier to a wide variety of chemicals and hydrocarbons.

Since the melt-mixed blend of the present invention also adheres directly to unmodified fluoropolymers and unmodified polyamides, pipes and liners comprising the blend can be composite structures further comprising additional fluoropolymer and/or polyamide layers. These composite structures have good integrity without requiring the use of an adhesive tie layer and the fluoropolymer or polyamide need not contain compatibilizing agents. Such composite structures may be formed by coextrusion. When the melt-mixed blend is to be used in combination with a fluoropolymer layer, grafted fluoropolymer in the blend is preferably present in an amount that is effective in causing the blend to adhere to the fluoropolymer layer. Such amount will vary with the identity of the fluoropolymer in the fluoropolymer layer, and/or the amount of polar functional compound grafted to the fluoropolymer component of the blend.

The adhesion of further polyamide or fluoropolymer layers to the melt-mixed blend used in the invention can depend on laminating conditions as well as on the compositions of the additional layers. Conditions can include temperature, extrusion speed, draw down ratio, draw ratio balance, interfacial pressure, cooling rate, cooling conditions and the like, and can be influenced by equipment choices such as mandrel length, die design features including land length.

The blends used in the present invention may also be used in the manufacture of fuel lines for automotive applications such as car and trucks or other conveyances such as airplanes. Such fuel lines are tubes that serve to convey gasoline or diesel fuel from the onboard storage tank to the engine and preferably have a low permeability to hydrocarbons. Fuel lines can comprise a single layer of the melt-mixed blend of polyamide with grafted fluoropolymer having polar functionality used in the present invention. They may also comprise a laminate or composite structure, which may be formed by coextrusion. This laminate may comprise, in addition to the melt-mixed blend, one or more additional layers of polyamide and/or fluoropolymer.

The pipes and liners of the present invention have uses oil and gas industry applications that include, but are not limited to, line pipes, flexible pipes, down hole casing, down hole casing liners, distribution piping, sucker rods, siphon strings, horizontal piping, horizontal pipe lining, hydraulic hoses, flexible pipes, and pressurized hoses.

What is claimed is:

1. A pipes or liner suitable for use in transporting substances in oil and gas applications, comprising a melt-mixed blend of:

(a) at least one polyamide and;

(b) at least one grafted fluoropolymer having polar functionality, wherein said fluoropolymer is incompatible with said at least one polyamide (a);

wherein said polyamides (a) are in a continuous matrix phase and said fluoropolymers (b) are present in a discontinuous distributed phase in the form of a multitude of thin, substantially parallel, and overlapping layers of material embedded in the continuous phase.

2. The pipe or liner of claim 1 wherein the at least one grafted fluoropolymer having polar functionality is present in layers of material more than about 0.5 micrometers and less than about 50 micrometers thick.

3. The pipe or liner of claim 1 wherein the at least one polyamide is selected from the group consisting of polycaproamide, poly(11-aminoundecanoamide), polydodecanoamide, poly(hexamethylene sebacamide), poly(hexamethylene dodecanoamide), and copolymers of poly(hexamethylene adipamide) with polycaproamide.

4. The pipe or liner of claim 1 wherein the at least one polyamide includes amorphous polyamide copolymers derived in part from aromatic monomers.

5. The pipe or liner of claim 1 wherein the melt-mixed blend further comprises at least one plasticizer.

6. The pipe or liner of claim 1 wherein the melt-mixed blend further comprises at least one lubricating agent.

7. The pipe or liner of claim 1 wherein the melt-mixed blend further comprises at least one stabilizer.

8. The pipe or liner of claim 1 wherein the at least one polyamide each has a melting point in the range of about 170° C. to 270° C.

9. The pipe or liner of claim 1 wherein the at least one polyamide each has a melting point in the range of about 180° C. to 240° C.

10. The pipe or liner of claim 1 wherein the at least one polyamide is present in about 70 to 95 weight percent, and the at least one grafted fluoropolymer having polar functionality is present in about 5 to 30 weight percent, where all weight percents are based on the total amount of polyamide and grafted fluoropolymer having polar functionality.

11. The pipe or liner of claim 1 wherein the at least one grafted fluoropolymer having polar functionality is selected from the group consisting of fluoropolymers that have carboxylic moieties grafted thereto, either on the fluoropolymer backbone itself or on side chains.

12. The pipe or liner of claim 1 wherein the at least one grafted fluoropolymer having polar functionality is selected from the group consisting of fluoropolymers that have epoxides grafted thereto, either on the fluoropolymer backbone itself or on side chains.

13. The pipe or liner of claim 1 in the form of a flexible pipe.

14. The pipe or liner of claim 1 in the form of a line pipe.

15. The liner of claim 1 in the form of a downhole casing liner.

16. The pipe or liner of claim 1 further comprising at least one additional coextruded layer comprising polyamide and/or fluoropolymer.

17. A fuel line, comprising a melt-mixed blend of:

(a) at least one polyamide and;

(b) at least one grafted fluoropolymer having polar functionality, wherein said fluoropolymer is incompatible with said at least one polyamide (a);

wherein said polyamides (a) are in a continuous matrix phase and said fluoropolymers (b) are present in a discontinuous distributed phase in the form of a multitude of thin, substantially parallel, and overlapping layers of material embedded in the continuous phase.

18. The fuel line of claim 17 further comprising at least one additional coextruded layer comprising polyamide and/or fluoropolymer.

\* \* \* \* \*